(12) United States Patent
Huang et al.

(10) Patent No.: US 10,098,033 B2
(45) Date of Patent: Oct. 9, 2018

(54) GROUP PDN METHOD TO SUPPORT MTC DEVICES ON CELLULAR NETWORK

(71) Applicant: Verizon Patent and Licensing Inc., Basking Ridge, NJ (US)

(72) Inventors: Ye Huang, San Ramon, CA (US); Yee Sin Chan, San Jose, CA (US); Sergei Karpov, San Ramon, CA (US); Priscilla Lau, Fremont, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 111 days.

(21) Appl. No.: 15/223,183

(22) Filed: Jul. 29, 2016

(65) Prior Publication Data
US 2018/0035327 A1 Feb. 1, 2018

(51) Int. Cl.
*H04W 28/02* (2009.01)
*H04L 12/66* (2006.01)
*H04W 8/04* (2009.01)
*H04W 4/70* (2018.01)
*H04W 88/16* (2009.01)
*H04W 84/04* (2009.01)

(52) U.S. Cl.
CPC ......... *H04W 28/0268* (2013.01); *H04L 12/66* (2013.01); *H04W 4/70* (2018.02); *H04W 8/04* (2013.01); *H04W 84/042* (2013.01); *H04W 88/16* (2013.01)

(58) Field of Classification Search
CPC . H04W 28/0268; H04W 4/0005; H04W 8/04; H04W 84/042; H04L 12/66
See application file for complete search history.

(56) References Cited

U.S. PATENT DOCUMENTS

2013/0155948 A1* 6/2013 Pinheiro ............... H04W 4/005
370/328

* cited by examiner

*Primary Examiner* — Jamal Javaid (57) ABSTRACT

Systems described herein use a group packet data network (PDN) to support communications from machine-type communications (MTC) devices on wireless networks. The systems assign a MTC device to a group with a group identifier, the group associating the MTC device, and other MTC devices, with a particular customer network; receive an attach request from the MTC device; retrieve, based on the attach request, the group identifier for the MTC device; configure a bearer path between the MTC device and the particular customer network, the bearer path including a group PDN that transports data packets from the MTC device, and the other MTC devices, between a serving gateway (SGW) and a PDN gateway (PGW); and send data packets from the MTC device over the group PDN.

20 Claims, 11 Drawing Sheets

| MTC Device 310 | UE ID 320 | Tunnel ID 330 | GroupPDN 340 | IP 350 | Group ID 360 | SGW-ID 370 | # of Members in group 380 |
|---|---|---|---|---|---|---|---|
| 1 | IMSI-1 | Teid-1 | vTEID-n | vIPn | Ent-X | n | |
| 2 | IMSI-2 | Teid-2 | vTEID-n | vIPn | Ent-X | n | 3 |
| 3 | IMSI-3 | Teid-3 | vTEID-n | vIPn | Ent-X | n | |
| 4 | IMSI-4 | Teid-4 | vTEID-m | vIPm | Ent-X | m | 2 |
| 5 | IMSI-5 | Teid-5 | vTEID-m | vIPm | Ent-X | m | |

FIG. 3

| UE 410 | UE ID 420 | External ID 430 | GroupPDN 440 | IP 450 | Group ID 460 | # of Members 470 |
|---|---|---|---|---|---|---|
| 1 | IMSI-1 | Ext-1 | vTEID-n | vIPn | Ent-X | 5 |
| 2 | IMSI-2 | Ext-2 | vTEID-n | vIPn | Ent-X | |
| 3 | IMSI-3 | Ext-3 | vTEID-n | vIPn | Ent-X | |
| 4 | IMSI-4 | Ext-4 | vTEID-m | vIPm | Ent-X | |
| 5 | IMSI-5 | Ext-5 | vTEID-m | vIPm | Ent-X | |

GROUP PDN METHOD TO SUPPORT MTC DEVICES ON CELLULAR NETWORK

BACKGROUND

The Internet of Things (IoT) may be described as a network of physical objects or "things" embedded with various types of electronics, software, sensors, logic, circuitry, etc., that can collect and exchange data. A "thing" (also referred to herein as a "machine-type communication (MTC) device") may connect to a service hosted on the Internet indirectly (e.g., via another network device, such as a coordinator, a gateway, etc.) or directly. The number of MTC devices is projected to grow exponentially in the years ahead. For network service providers, MTC support involves providing network services at a low cost and supporting millions or even billions of MTC devices. Current network resource allocation and management systems are inadequate to meet these demands in a cost-effective way.

DETAILED DESCRIPTION OF THE PREFERRED EMBODIMENTS

The following detailed description refers to the accompanying drawings. The same reference numbers in different drawings may identify the same or similar elements.

Systems and methods described herein use a group packet data network (PDN) to support the growing number of machine-type communications (MTC) devices on cellular or wireless networks, such as a long term evolution (LTE) 4G wireless network or other advance wireless networks.

Advanced wireless networks typically use an "always-on" paradigm that is resource intensive. Particularly, each device requires a PDN resource allocation at core network elements, including a serving gateway (SGW) and a PDN gateway (PGW). Often times, the PDN resources are not used to their full extent due to the infrequent and small-data nature of machine-type communications. As an alternative to the "always-on" paradigm, an on-demand PDN has been considered to improve PDN utilization at SGWs and PGWs. On-demand PDNs may require an increase in signaling among core network elements.

Systems and methods described herein create a group profile for a group PDN that can be used to simultaneously support communications with multiple MTC devices. Registered MTC devices in a group may share the same properties such as a session timer, quality of service (QoS), QoS class identifier (QCI), automatic repeat request (ARQ), and services (e.g., best effort data). Instead of allocating dedicated PDN resources for each MTC device, the systems and methods creates one or more group PDNs, depending on the location of MTC devices, between SGWs and PGWs.

According to one implementation, an MTC device may be assigned to a group with a group identifier, the group associating the MTC device and other MTC devices, with a particular customer network. A network device may receive an attach request from the MTC device and retrieve, based on the attach request, the group identifier for the MTC device. The network device may configure a bearer path between the MTC device and the particular customer network, the bearer path including a group PDN that transports data packets from the MTC device, and the other MTC devices, between an SGW and a PGW. The network may send, by one or more network devices, data packets initiating from the MTC device over the group PDN.

Figure 1:
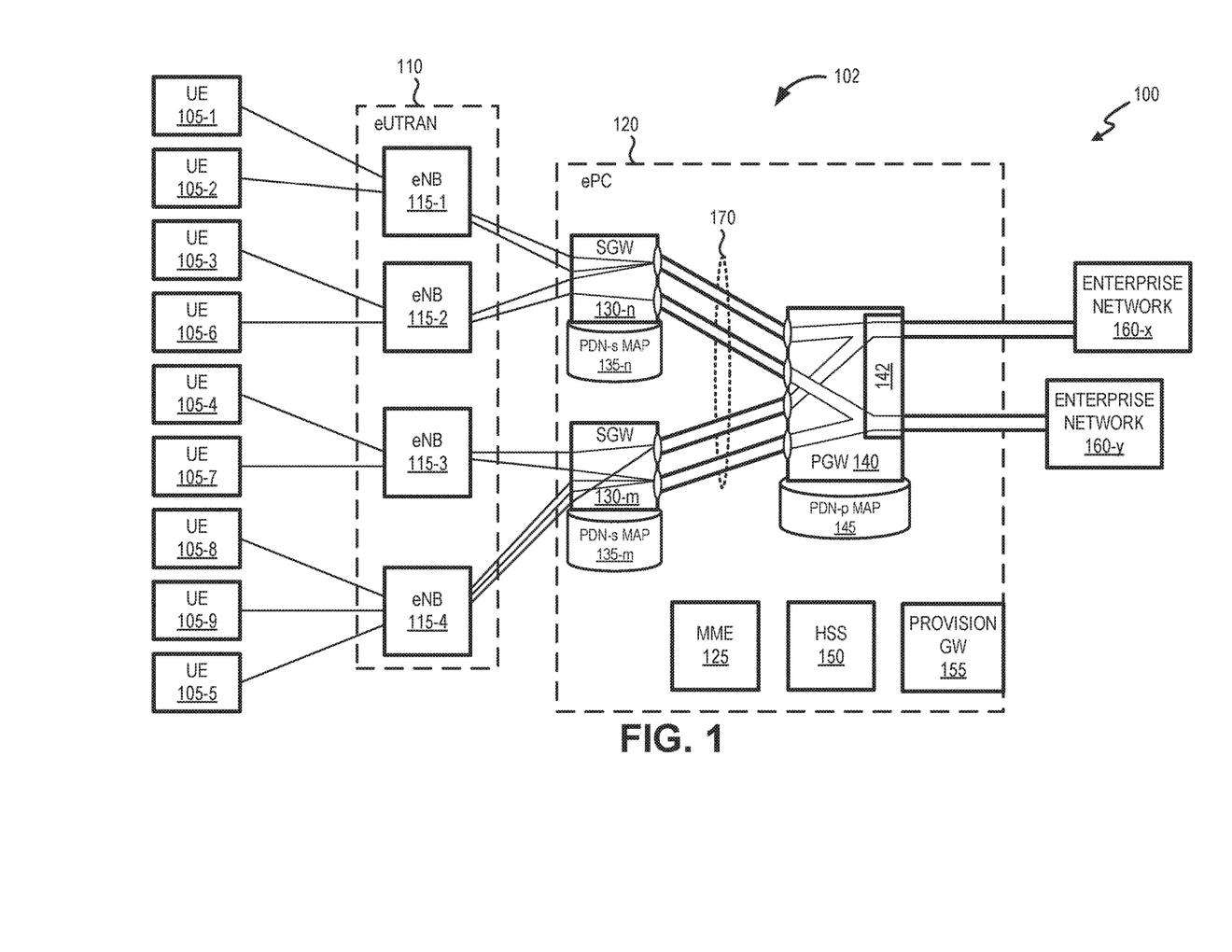
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include multiple MTC devices 105-1 through 105-9 (shown simply as UE 105-$x$ and referred to herein collectively as "MTC devices 105" and generically as "MTC device 105"); a wireless network 102 that may include an evolved UMTS Terrestrial Network (eUTRAN) 110 and an evolved Packet Core (ePC) 120; and enterprise networks 160-$x$ and 160-$y$ (referred to collectively as "enterprise networks 160" and generically as "enterprise network 160").

Wireless network 102 may be a long term evolution (LTE) 4G wireless network and may include one or more devices that are physical and/or logical entities interconnected via standardized interfaces. Wireless network 102 provides wireless packet-switched services and wireless IP connectivity to user devices (such as MTC device 105) to provide, for example, data, voice, and/or multimedia services. eUTRAN 110 may include one or more base stations 115 (e.g., an enhanced NodeB, also referred to herein as eNB 115). ePC 120 may further include a mobility management entity (MME) device 125, a serving gateway (SGW) devices 130-$n$ and 130-$m$ (referred to collectively as "SGWs 130" and generically as "SGW 130"), a packet data network gateway (PGW) device 140, a home subscriber server (HSS) device 150, and a provisioning gateway 155. It is noted that FIG. 1 depicts a representative network environment 100 with exemplary components and configuration shown for purposes of explanation. Other embodiments may include additional or different network entities in alternative configurations than which are exemplified in FIG. 1.

MTC device 105 may include a device that communicates with another device (e.g., a device in enterprise network 160) via machine-type communications. Such machine-type communications typically do not include manual human input. MTC device 105 may include a wide range of applications for monitoring and control purposes in fields such as industrial automation, logistics, Smart Grid, Smart Cities, health, defense, agriculture, etc. MTC device 105 may operate according to one or more versions of the LTE communication standard. In some instances, MTC device 105 may generate short messages and/or infrequent messages to support a particular application. In other instances, MTC device 105 may generate high bandwidth data or very frequent communication to support a particular application.

eNB 115 may include one or more devices and other components having functionality that allow MTC devices 105 to wirelessly connect to eUTRAN 110. eNB 115 may interface with ePC 120 via a S1 interface, which may be split into a control plane S1-MME interface and a data plane S1-U interface. The S1-MME interface may interface with MME device 125. The S1-MME interface may be implemented, for example, with a protocol stack that includes a Network Access Server (NAS) protocol and/or Stream Control Transmission Protocol (SCTP). The S1-U interface may interface with SGW 130 and may be implemented, for example, using a General Packet Radio Service Tunneling Protocol version 2 (GTPv2). One eNB 115 may communicate with anther eNodeB 115 in eUTRAN 110 via an X2 interface. An X2 interface may be implemented, for example, with a protocol stack that includes an X2 application protocol and SCTP.

MME device 125 (also simply referred to as MME 125) may include a network device to implement control plane processing for ePC 120. For example, MME 125 may implement tracking and paging procedures for MTC device 105, may activate and deactivate bearers for MTC device 105, may authenticate a user of MTC device 105, and may interface to non-LTE radio access networks. A bearer may represent a logical channel with particular quality of service (QoS) requirements. MME 125 may also select a particular SGW 130 for a particular MTC device 105. A particular MME 125 may interface with other MME devices 125 (not shown) in ePC 120 and may send and receive information associated with user equipment (UE, including MTC devices 105), which may allow one MME device to take over control plane processing of UEs serviced by another MME device, if the other MME device becomes unavailable. According to one implementation, MME 125 may obtain subscription profiles from HSS 150 and provide profile data, including group PDN assignments, to SGW 130 when MTC devices 105 attach to wireless network 102.

SGW device 130 (also simply referred to as SGW 130) may provide an access point to and from MTC device 105, may handle forwarding of data packets for MTC device 105, and may act as a local anchor point during handover procedures between eNBs 115. SGW 130 may interface with PGW 140 through an S5/S8 interface. The S5/S8 interface may be implemented, for example, using GTPv2. As shown in FIG. 1, SGW 130 may store a PDN-serving (PDN-s) map 135. As described further herein, PDN-s map 135 may be used to manage group PDNs (e.g., group PDNs 170) between SGW 130 and PGW device 140 for traffic from multiple MTC devices 105. According to an implementation described herein, SGW 130 may perform S1-U traffic aggregation. More particularly, applicable S1-U connections may be aggregated at each SGW 130 into a shared group PDN 170. In one implementation, the QoS for group PDN 170 may be dynamically adjusted based on the number of devices attached to the group PDN 170. In another implementation, group PDN 170 may be assigned a static QoS allocation.

SGW 130 may communicate with MME 125 through an S11 interface. The S11 interface may be implemented, for example, using GTPv2. The S11 interface may be used to create and manage a new session for a particular MTC device 105 or to add an MTC device 105 to an existing group PDN. The S11 interface may be activated when MME 125 needs to communicate with SGW 130, such as when an MTC device 105 attaches to ePC 120, when bearers need to be added or modified for an existing session for the particular MTC device 105, when a connection to a new PGW 140 needs to created, or during a handover procedure (e.g., when the particular MTC device 105 needs to switch to a different SGW 130).

PGW device 140 (also simply referred to as PGW 140) may function as a gateway to enterprise networks 160. In one implementation, other networks, such as an IP network (not shown) may be included between PGW 140 and enterprise networks 160. As shown in FIG. 1, PGW 140 may store a version of a PDN map, (PDN-p) map 145. As described further herein, PDN-p map 145 may be used to manage group PDNs (e.g., group PDNs 170) between SGW 130 and PGW device 140 for traffic from multiple MTC devices 105. A described further herein, PGW 140 may include a multiplex/demultiplex module 142, either within PGW 140 or as a separate element, between enterprise networks 160 and PGW 140. For example, using PDN-p map 145, multiplex/demultiplex module 142 may aggregate traffic from an enterprise network 160 for distribution over one of group PDNs 170 and/or separate aggregated traffic from one of SGW 130 for distribution to particular devices within enterprise network 160.

HSS device 150 (also simply referred to as HSS 150) may store information associated with MTC devices 105 and/or information associated with users/owners of MTC device 105. For example, HSS 150 may store subscription profiles that include authentication and access authorization information. As described further herein, the subscription profiles may also include group PDN assignments for each applicable MTC device 105. Information for subscription profiles and group PDN assignment may be obtained, for example, from provision gateway 155. HSS 150 may communicate with MME 125 to allow MME 125 to access subscription profile information during, for example, initial attachment for MTC devices 105. HSS 150 may also communicate with PGW 140 to allow PGW 140 to map signals from enterprise network 160 over a group PDN to individual MTC devices 105.

Provision gateway 155 may include a network device that collects MTC device management information from customers and generates subscription profiles for use in ePC 120. According to an implementation, provision gateway 155 may provide application program interfaces (APIs) that customers can use to registered MTC devices 105. According to another implementation, provision gateway 155 may provide a user interface (e.g., a web site, portal, or another network access) to register one or multiple MTC device 105 for MTC services with wireless network 102. For example, a customer may use a user device (e.g., a computer, work station, smart phone, etc.) to provision gateway 155 by providing descriptions for each MTC device 105 associated with an enterprise network 160. Descriptions may include a unique device identifier (such as International Mobile Subscriber Identity (IMSI), an International Mobile Station Equipment Identity (IMEI), serial number, etc.) for each MTC device 105 and service requirements (e.g., QoS, service type, etc.). Descriptions may also include an external device identifier (ID) for a device within enterprise network 160. The external device identifier may, for example, be used to map to a device IMSI within enterprise network 160.

For example, descriptions may identify a group of MTC devices 105 for routine monitoring and low-priority communications associated with one device in enterprise network 160-x and another group of MTC devices 105 for frequent high-priority communications associated with a different device in enterprise network 160-x. Based on, for example, the descriptions, provision gateway 155 may assign each MTC device 105 to one or more PDN groups.

PDN group assignments for each MTC device 105 may be stored and sent by provision gateway 155 to HSS 150 for inclusion with subscriber profiles. The subscriber profiles may be stored in a database, memory, or another storage medium of HSS 150. As described further herein, the subscriber profiles may be accessed by HSS 150 in response to a request (e.g., an update location request, etc.) from MME 125 and may be used to create or modify group PDNs 170 for MTC devices 105.

Enterprise network 160 may include a customer network that receives services from wireless network 102. Enterprise network 160 may include a local area network (LAN), a wide area network (WAN), or a combination of networks that provide network access to devices in wireless network 102. In one implementation, enterprise network 160 may include a network interconnecting one or more user devices, such as devices providing data services (e.g., personal computers, workstations, laptops, etc.), devices providing voice services (e.g., telephones), and/or devices providing video services (e.g., televisions, set-top boxes, etc.). In another implementation, enterprise network 160 may include one or more application servers for particular MTC devices 105. The application servers may, for example, receive and process MTC data from MTC device 105. In another implementation, enterprise network 110 may include one or more gateway (GW) routers (e.g., customer premises equipment) that provide act as a secure gateway for devices within enterprise network 110.

Devices and networks of environment 100 may be interconnected via wired and/or wireless connections. While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

Still referring to FIG. 1, according to implementations described herein, each MTC device 105 may be registered with wireless network 102. Each registration may provide a unique device identifier (e.g., an IMEI or IMSI) for each MTC device 105 and particular service requirements for data to be generated/sent by MTC device 105. Registration may also indicate, for example, the owner of MTC device 105, the type of device, the model number, the serial number, and/or information to identify particular devices (within enterprise network 160) with which MTC devices 105 will connect. According to an implementation, the registered MTC devices 105 may also be passed through an onboarding process, which makes sure each MTC device has the necessary software (firmware) loaded for security and best practices to maximize network performance. In some implementations, software or firmware upgrades for MTC devices 105 can be done securely through a wireless network over-the-air service, which can use multicast for large-scale device upgrades.

After device registration, when an MTC device 105 attaches to wireless network 102, MME 125 may associate the MTC device with a particular group PDN (e.g., one of the four group PDNs 170 shown in FIG. 1). MME 125 will direct a SGW 130 to use the appropriate group PDN for traffic to/from MTC device 105. SGW 130 may aggregate traffic (S1-U interface traffic) from multiple MTC devices 105 that are associated with the same group PDN 170. One group PDN 170 may be created per SGW/PGW pair per enterprise network. Thus, the arrangement of FIG. 1 would use up to four group PDNs 170—one for each of enterprise networks 160-x and 160-y between SGW 130-n and PGW 140, and another one for each of enterprise networks 160-x and 160-y between SGW 130-m and PGW 140. Bandwidth to support a designated QoS for a group PDN 170 can be dynamically adjusted based on the number of devices attached to the group PDN or a static allocation may be used.

Figure 2:
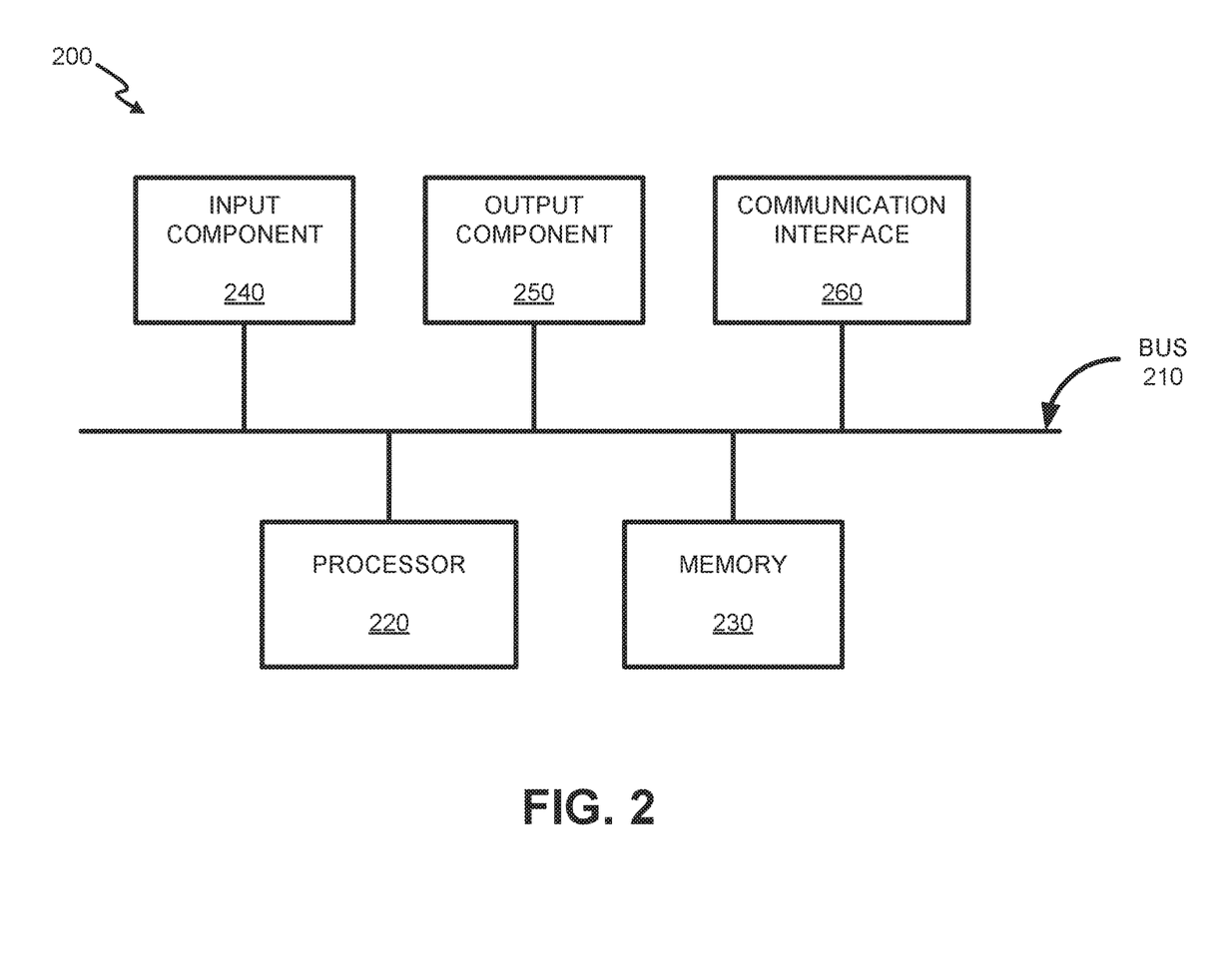
FIG. 2 shows a diagram of exemplary components that may be included in a device included in the network environment shown in FIG. 1.

FIG. 2 is a diagram illustrating exemplary components of a device 200. Device 200 may correspond, for example, to a component of MTC device 105, eNB 115, MME 125, SGW 130, PGW 140, HSS 150, devices in enterprise network 160, or another component of wireless network 102. Alternatively or additionally, MTC device 105, eNB 115, MME 125, SGW 130, PGW 140, HSS 150, and devices in enterprise network 160 may include one or more devices 200 and/or one or more components of device 200.

Device 200 may include a bus 210, a processor 220, a memory 230, an input component 240, an output component 250, and a communication interface 260. Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. Communication interface 260 may, for example, receive RF signals and transmit them over the air to MTC device 105/eNB 115, and receive RF signals over the air from eNB 115/MTC device 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Figure 3:
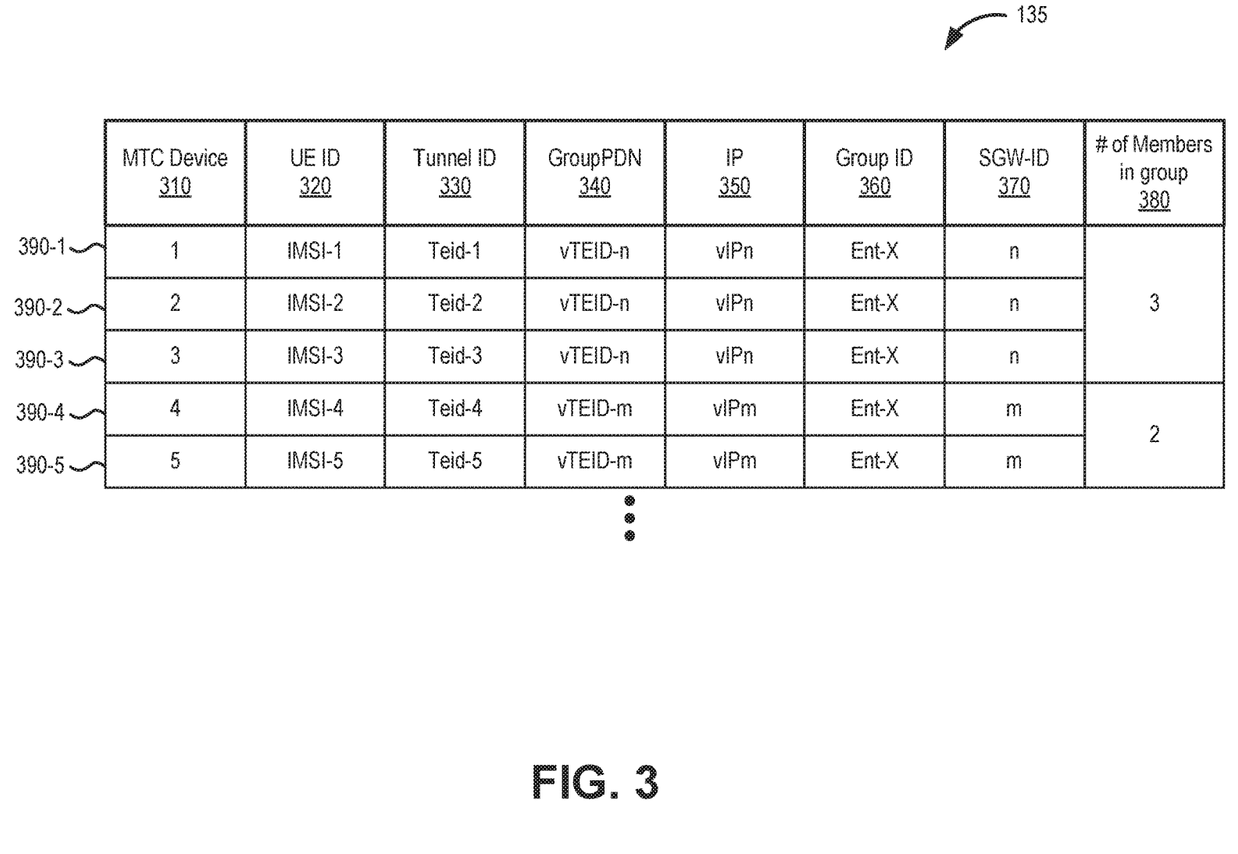
FIG. 3 is a diagram illustrating a portion of a packet data network (PDN) map for a service gateway (SGW) device of FIG. 1.

FIG. 3 is a diagram illustrating a portion of PDN-s map 135 used by SGW 130. As shown in FIG. 3, PDN-s map 135 may include an MTC device field 310, a UE ID field 320, a Tunnel identifier (ID) field 330, a group PDN field 340, an IP field 350, a group ID field 360, a SGW-ID field 370, a number of members field 380, and a variety of entries 390. PDN-s map 135 may be used by SGW 130 to route traffic to/from MTC devices 105 using group PDNs. PDN-s map 135 may be dynamically updated by SGW 130 as MTC devices 105 are added and removed from a group PDN.

MTC device field 310 serves as an index field and may include a name or identifier (e.g., serial number, corporate tracking number, etc.) for MTC device 105. UE ID field 320 may include an IMSI (or another globally-unique identifier) for the MTC device in MTC device field 310. Tunnel identifier (ID) field 330 may indicate a tunnel endpoint ID for the MTC device in MTC device filed 310. Group PDN field 340 may include a group PDN identifier—for a particular SGW 130, PGW 140, and enterprise network 160— that can carry traffic for multiple MTC devices 105. IP field 350 includes an IP address for a group PDN with which the MTC device in MTC device field 310 is associated (e.g., in contrast with an IP address for the individual MTC device or access point). Group ID field 360 identifies an enterprise (e.g., one of enterprise networks 160-x or 160-y) with which the MTC device in MTC device field 310 is associated. SGW-ID field 370 includes a unique identifier for the SGW (e.g., SGW 130-n or 130-m) corresponding to the entry in group PDN field 340. Number of members field 380 includes a cumulative count of the MTC devices 105 currently using the vPDN indicated in corresponding group PDN field 340.

Figure 4:
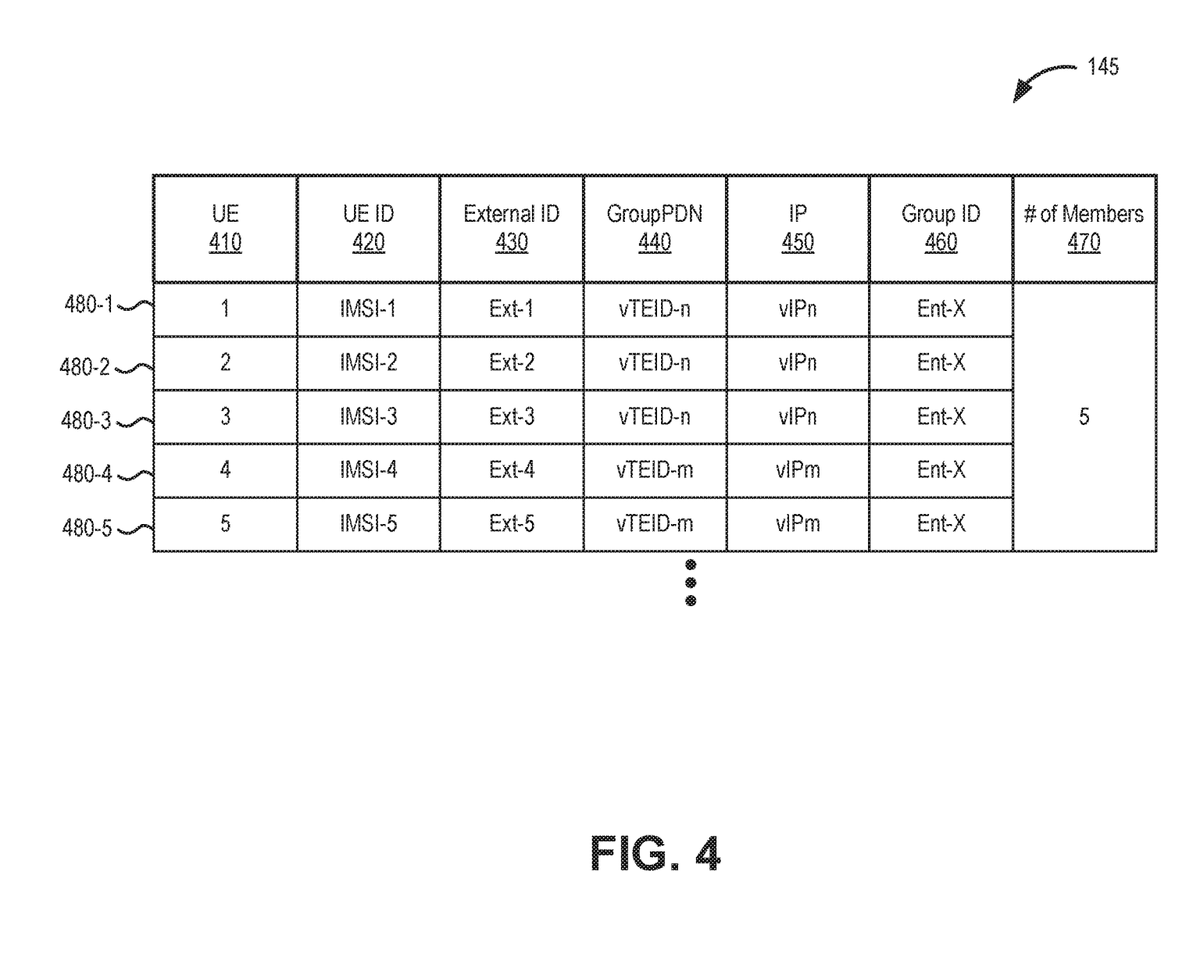
FIG. 4 is diagram illustrating a portion of a packet data network (PDN) map for a PDN gateway (PGW) device of FIG. 1.

FIG. 4 is a diagram illustrating a portion of PDN-p map 145 used by PGW 140. As shown in FIG. 4, PDN-p map 145 may include an MTC device field 410, a UE ID field 420, an external ID field 430, a group PDN field 440, an IP field 450, a group field 460, a number of members field 470, and a variety of entries 480. PDN-p map 145 may be used by PGW 140 to route traffic to/from MTC devices 105 using group PDNs. PDN-p map 145 may be dynamically updated by PGW 140 as MTC devices 105 are added and removed from a group PDN.

MTC device field 410 corresponds to MTC device field 310 of FIG. 3 and also serves as an index field. UE ID field 420 corresponds to UE ID field 320 of FIG. 3. External ID field 430 includes an external identifier (e.g., "Ext-1") for a device of enterprise network 160 that is exchanging data with one of MTC devices 105. The external identifier may be cross-referenced within enterprise network 160 to a private IP address or another identifier for a device within enterprise network 160. Group PDN field 440 corresponds to group PDN field 340 of FIG. 3. IP field 450 corresponds to IP field 350 of FIG. 3. Group ID field 460 corresponds to group field 360 of FIG. 3. In contrast with number of members field 380 of FIG. 3, number of members field 470 provides a total number of members exchanging data with enterprise network 160-x via PGW 140.

Figure 5A:
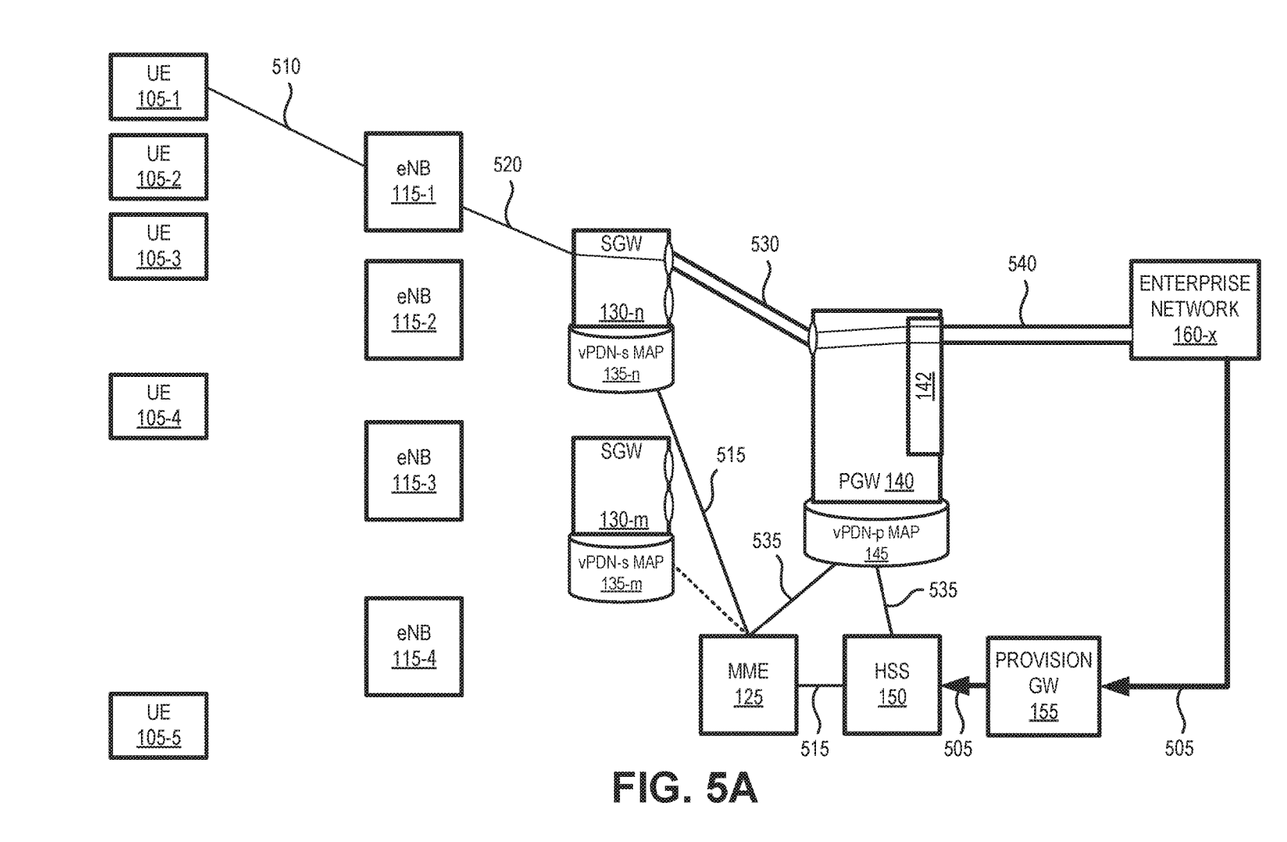
FIGS. 5A-5C are schematic diagrams illustrating configuration of a group PDN in a portion of the network environment of FIG. 1.
Figure 5B:
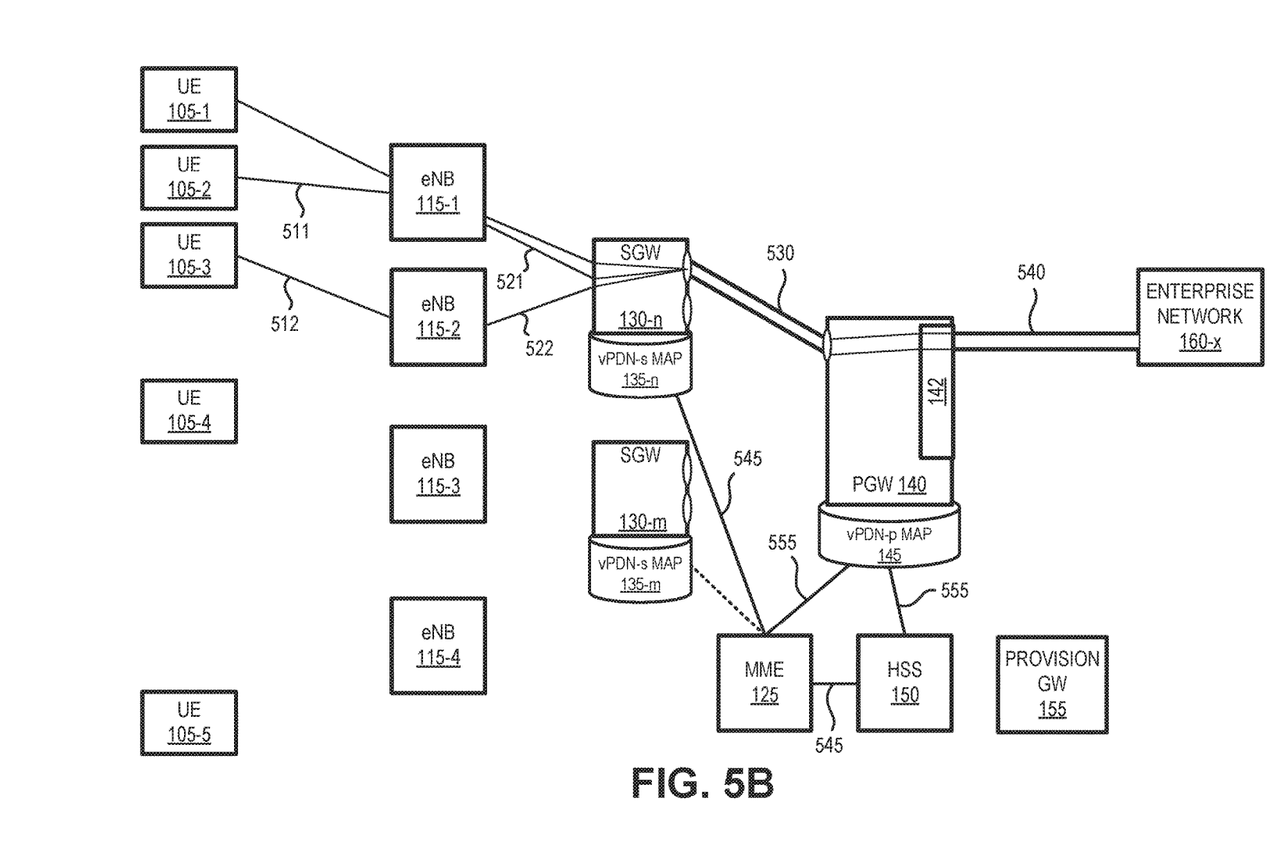
Figure 5C:
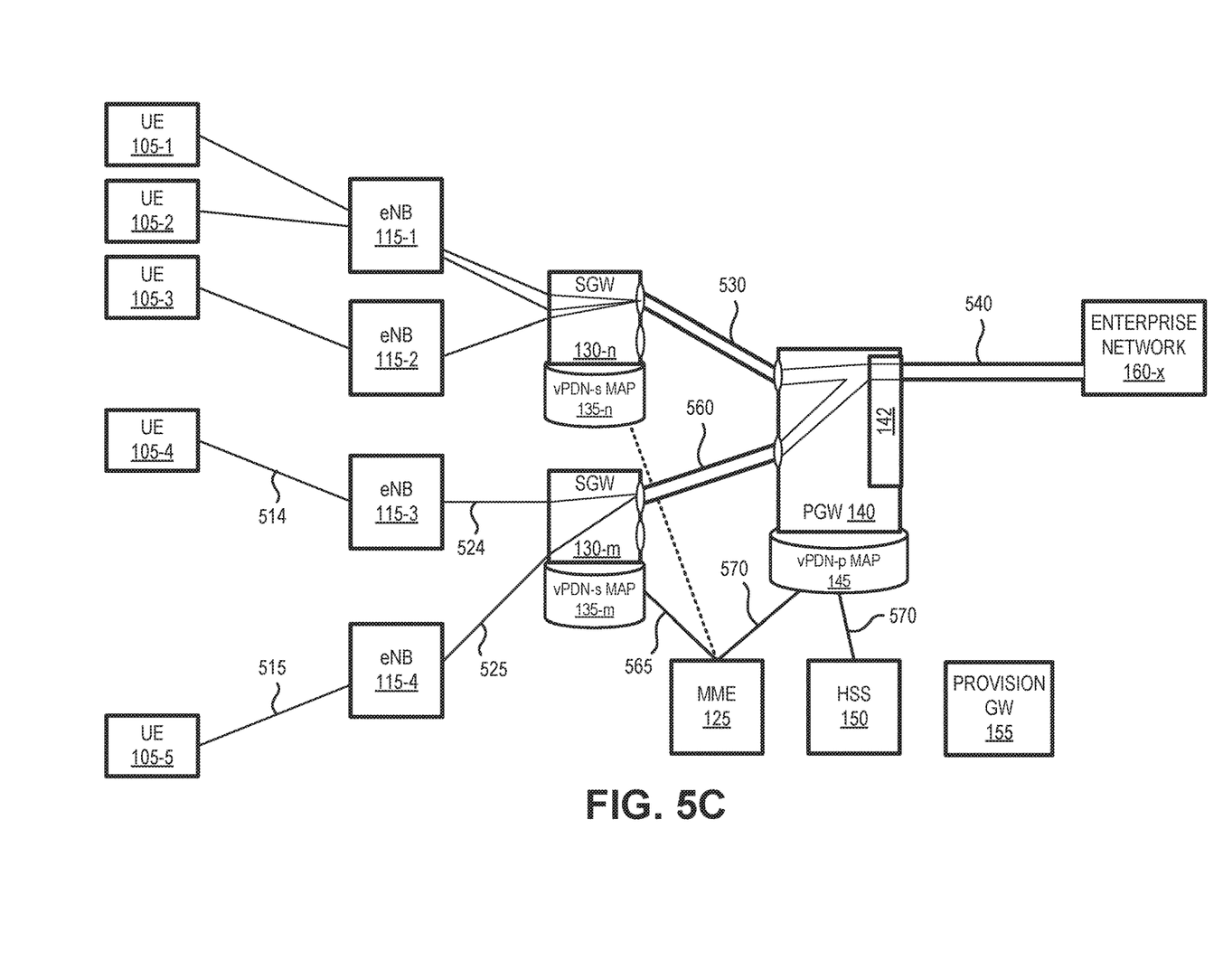

FIGS. 5A-5C are schematic diagrams illustrating configuration of a group PDN in a portion 500 of network environment 100. FIGS. 5A-5C provide a simplified bearer configuration setup for five MTC devices 105 with enterprise network 160-x. Network portion 500 may include MTC devices 105-1 through 105-5, eNBs 115-1 through 115-4, MME 125, SGWs 130-m and 130-n, PGW 140, HSS 150, provision gateway 155, and enterprise network 160-x.

As shown in FIG. 5A, enterprise network 160-x (or another user device associated with an enterprise) may provide registration data 505 for MTC devices 105 to provision gateway 155. Registration data 505 may include, for example, an IMSI, and external ID, and a group ID to be associated with each MTC device 105. Provision gateway 155 may receive registration data 505, for example, via APIs or a user interface. Provisioning gateway 155 may provide registration data 505 to HSS 150 for storage as part of a subscription profile for each MTC device 105.

After registration data 505 is provided, MTC device 105-1 may initiate a connection with enterprise network 160-x. More specifically, MTC device 105-1 may initiate an attach sequence by providing an attach request 510 via eNB 115-1 which is associated with SGW 130-n. Attach request 510 may include the IMSI for MTC device 105-1. As part of the attach sequence (not shown), MME 125 may receive attach request 510 and may obtain from HSS 150 profile data 515 for MTC device 105-1. MME 125 may provide relevant profile data 515 from the subscription profile to SGW 130-n. Particularly, profile data 515 may include the IMSI for MTC device 105-1 and a group ID that associates MTC device 105-1 with enterprise network 160-x. SGW 130-n may use profile data 515 to create a bearer 520 between MTC device 105-1, eNB 115-1, and SGW 130-n over an S1-U interface.

Using profile data 515, SGW 130-n may also provide a create session request to PGW 140 for creation of a group PDN 530. Group PDN 530 may correspond to one of group PDNs 170 of FIG. 1. The create session request may include the IMSI and group ID for MTC device 105-1, along with other information. PGW 140 may exchange data 535 with MME 125 and/or HSS 150 to verify the group PDN configuration. Upon successful creation of group PDN 530, SGW 130-n may create an entry (e.g., entry 390-1 of FIG. 3) in PDN-s map 135-n. Similarly, PGW 140 may create an entry (e.g., entry 480-1 of FIG. 4) in PDN-p map 145. A connection 540 (e.g., a dedicated broadband connection) between PGW 140 and enterprise network 160-x may complete a bearer path between MTC device 105-1 and enterprise network 160-x.

Referring to FIG. 5B, after a bearer path for MTC device 105-1 is created, MTC devices 105-2 and 105-3 may initiate a connection with enterprise network 160-x. More specifically, MTC device 105-2 may initiate an attach sequence by providing an attach request 511 via eNB 115-1, and MTC device 105-3 may initiate an attach sequence by providing an attach request 512 via eNB 115-2, which is also associated with SGW 130-n. Attach request 511 may include the IMSI for MTC device 105-2, and attach request 512 may include the IMSI for MTC device 105-3. As part of the attach sequence (not shown), MME 125 may obtain from HSS 150 profile data 545 for MTC devices 105-2 and 105-3, and MME 125 may provide relevant profile data 545 from the subscription profiles to SGW 130-*n*. Particularly, profile data 545 may include the group ID that associates MTC device 105-2 and 105-3 with enterprise network 160-*x*. SGW 130-*n* may use profile data 545 to create a bearer 521 between MTC device 105-2 and SGW 130-*n* (via eNB 115-1) over an S1-U interface. SGW 130-*n* may use profile data 545 to create a bearer 522 between MTC device 105-3 and SGW 130-*n* (via eNB 115-2) over an S1-U interface.

Using profile data 545, SGW 130-*n* may associate MTC devices 105-2 and 105-3 with existing group PDN 530. PGW 140 may exchange data 555 with MME 125 and/or HSS 150 to update and/or verify group PDN 530 configuration. In one implementation, bandwidth allocations for group PDN 530 may be updated to accommodate additional traffic flow for MTC devices 105-2 and 105-3. SGW 130-*n* may create new entries for MTC devices 105-2 and 105-3 (e.g., entries 390-2 and 390-3 of FIG. 3) in PDN-s map 135-*n*. Similarly, PGW 140 may create new entries for MTC devices 105-2 and 105-3 (e.g., entries 480-2 and 480-3 of FIG. 4) in PDN-p map 145. Thus, a bearer path may be established between MTC device 105-2 and enterprise network 160-*x* via bearer 521 and the previously-established group PDN 530 and connection 540. Similarly, a bearer path may be established between MTC device 105-3 and enterprise network 160-*x* via bearer 522 and the previously-established group PDN 530 and connection 540.

Referring to FIG. 5C, after a bearer path for MTC device 105-1 is created, MTC devices 105-4 may initiate a connection with enterprise network 160-*x*. More specifically, MTC device 105-4 may initiate an attach sequence by providing an attach request 514 via eNB 115-3, which is associated with SGW 130-*m*. Attach request 514 may include the IMSI for MTC device 105-4. As part of the attach sequence (not shown), MME 125 may obtain from HSS 150 profile data 565 for MTC device 105-4, and MME 125 may provide relevant profile data 565 from the subscription profiles to SGW 130-*m*. Particularly, profile data 565 may include the group ID that associates MTC device 105-4 with enterprise network 160-*x*. SGW 130-*m* may use profile data 565 to create a bearer 524 for MTC device 105-4 and SGW 130-*n* (via eNB 115-3) over an S1-U interface.

Using profile data 565, SGW 130-*m* may also provide a create session request to PGW 140 for creation of a group PDN 560. The create session request may include the IMSI and group ID for MTC device 105-4, along with other information. PGW 140 may exchange data 570 with MME 125 and/or HSS 150 to verify the group PDN configuration. Upon successful creation of group PDN 560, SGW 130-*m* may create an entry (e.g., entry 390-4 of FIG. 3) in PDN-s map 135-*m*. Similarly, PGW 140 may create an entry (e.g., entry 480-4 of FIG. 4) in PDN-p map 145. Connection 540 between PGW 140 and enterprise network 160-*x*, which was previously created during attachment of MTC device 105-1, may complete a bearer path between MTC device 105-4 and enterprise network 160-*x*.

Still referring to FIG. 5C, after a bearer path for MTC device 105-4 is created, MTC device 105-5 may initiate a connection with enterprise network 160-*x*. More specifically, MTC device 105-5 may initiate an attach sequence by providing an attach request 515 via eNB 115-4, which is also associated with SGW 130-*m*. Attach request 515 may include the IMSI for MTC device 105-5. As part of the attach sequence (not shown), MME 125 may obtain from HSS 150 profile data 565 for MTC device 105-5, and MME 125 may provide relevant profile data 565 from the subscription profiles to SGW 130-*m*. Particularly, profile data 565 may include the group ID that associates MTC device 105-5 with enterprise network 160-*x*. SGW 130-*m* may use profile data 565 to create a bearer 525 between MTC device 105-5 and SGW 130-*m* (via eNB 115-4) over an S1-U interface.

Using profile data 565, SGW 130-*m* may associate MTC device 105-5 with existing group PDN 560. PGW 140 may exchange data 570 with MME 125 and/or HSS 150 to update and/or verify the group PDN 560 configuration. SGW 130-*m* may create a new entry for MTC device 105-5 (e.g., entry 390-5 of FIG. 3) in PDN-s map 135-*m*. Similarly, PGW 140 may create a new entry for MTC device 105-5 (e.g., entries 480-5 of FIG. 4) in PDN-p map 145. Thus, a bearer path may be established between MTC device 105-5 and enterprise network 160-*x* via bearer 525, group PDN 560 (which was previously created during attachment of MTC device 105-4), and connection 540 (which was previously created during attachment of MTC device 105-1).

As described above, network attachment by the first device within a group (e.g., MTC device 105-1 above) will initiate the group PDN creation, and other MTC devices within the same area and anchored on the same SGW 130 (e.g., MTC devices 105-2 and 105-3) will join group PDN 530 such that traffic for those MTC devices 105 will be multiplexed over the same group PDN 530. As MTC devices 105 detach from ePC network 120, group PDN will 530 will remain active and bandwidth allocations for group PDN 530 may be reduced. The last MTC device 105 leaving the group will constitute the release of group PDN 530.

Although FIGS. 5A-5C illustrate exemplary messaging and describe exemplary processes to arrange network paths for machine-type communications, according to other embodiments, MTC devices 105 and/or network elements of network portion 500 (e.g., MME 125, SGW 130, PGW 140, HSS 150, etc.) may perform additional, different, and/or fewer processes to provide connections between MTC devices 105 to enterprise network 160-*x*. For example, a different order of communications than those described in FIGS. 5A-5C may be used to configure the bearer paths. Alternatively, new or modified messages and/or new or modified interfaces associated with the network elements may be implemented to accomplish the same tasks as described.

Figure 6:
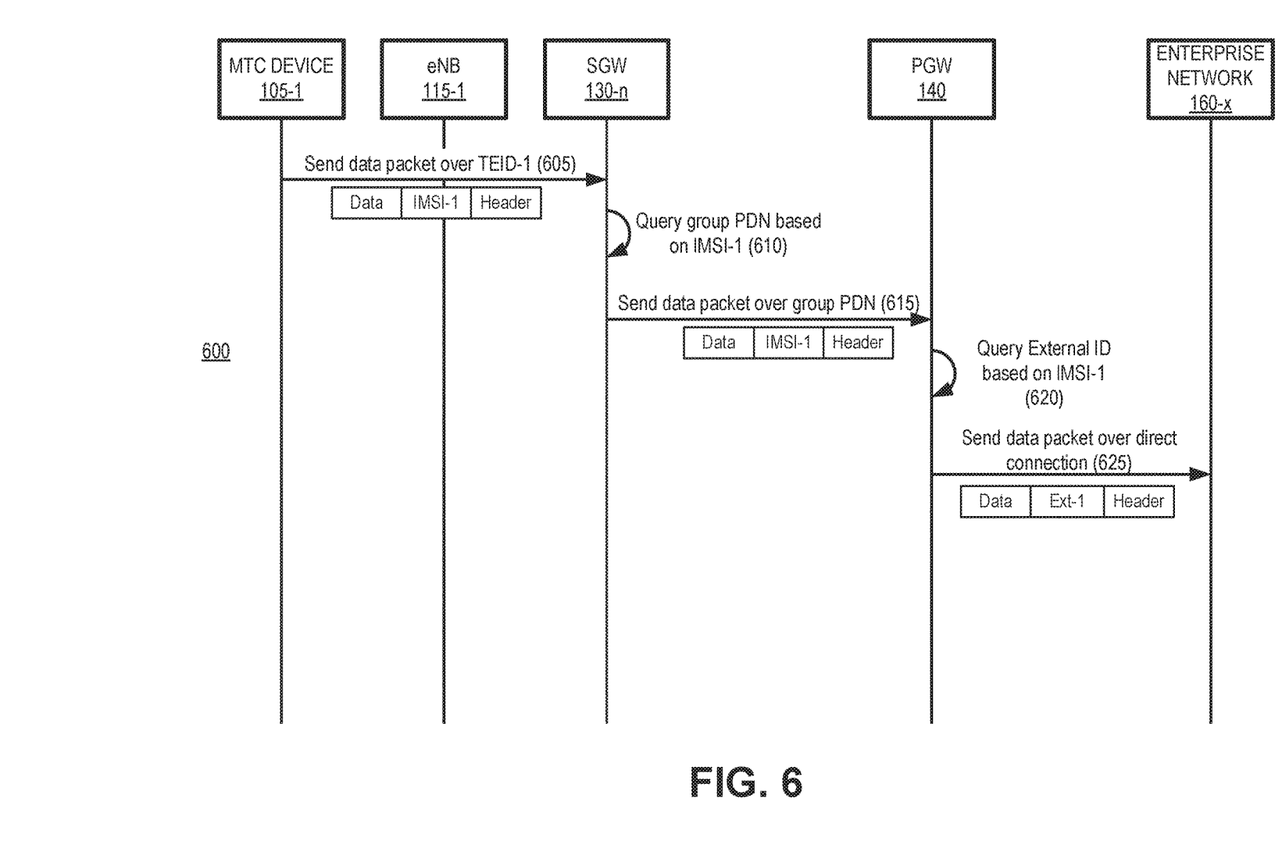
FIG. 6 is a schematic diagrams illustrating communications for sending data from an MTC device to an enterprise using a group PDN in a portion of the network environment of FIG. 1.

FIG. 6 is a diagram showing communications in a portion 600 of network environment 100. FIG. 6 represents communications for transmitting a data packet from MTC device 105-1 to enterprise network 160-*x* using a group PDN. Network portion 600 may include MTC device 105-1, eNB 115-1, SGW 130-*n*, PGW 140, and enterprise network 160-*x*. Assume for FIG. 6, that MTC device 105-1 has been previously registered with ePC network 120 through provision gateway 155 and been assigned to a group associated with enterprise network 160-*x*. Assume further that a bearer path between MTC device 105-1 and enterprise network 160-*x* was previously established as shown above in FIG. 5A.

As shown in reference 605 FIG. 6, MTC device 105 may send data packets over TEID-1 to SGW 130-N. The data packets may include a header (e.g., an IP header), an IMSI value for MTC device 105 (e.g., IMSI-1), and data. SGW 130-*n* may receive the data packets from MTC device 105-1 via eNB 115-1 over an S1-U interface. As shown by reference 610, SGW 130-*n* may use the IMSI value (IMSI-1) to query a group PDN for MTC device 105-1. For example, SGW 130-*n* may use PDN-s map 135 (entry 390-1 of FIG. 3) to match IMSI-1 (in UE ID field 320) with vTEID-n (in GroupPDN field 340).

Based on query 610, SGW 130-*n* may send each of the data packets, (including the header, IMSI value, and data) via the assigned group PDN (e.g., vTEID-n) to PGW 140, as shown by reference 615. As shown by reference 620, PGW 140 may use the IMSI value (IMSI-1) to query an external ID, associated with MTC device 105-1, for enterprise network 160-*x*. For example, PGW 140 may use PDN-p map 145 (entry 480-1 of FIG. 4) to match IMSI-1 (in UE ID field 420) with Ext-1 (in External ID field 430). PGW 140 may modify the data packets received from SGW 130-*n* to replace the UE ID (IMSI-1) with the external ID (Ext-1).

As shown by reference number 625, PGW 140 may forward the modified data packets to enterprise network 160, the modified data packets including the header, the external ID for a device in enterprise network 160-*x* (e.g., Ext-1), and data. Based on the external ID, enterprise network 160-*x* may direct the data packet to a particular IP address or device within enterprise network 160-*x*.

Figure 7:
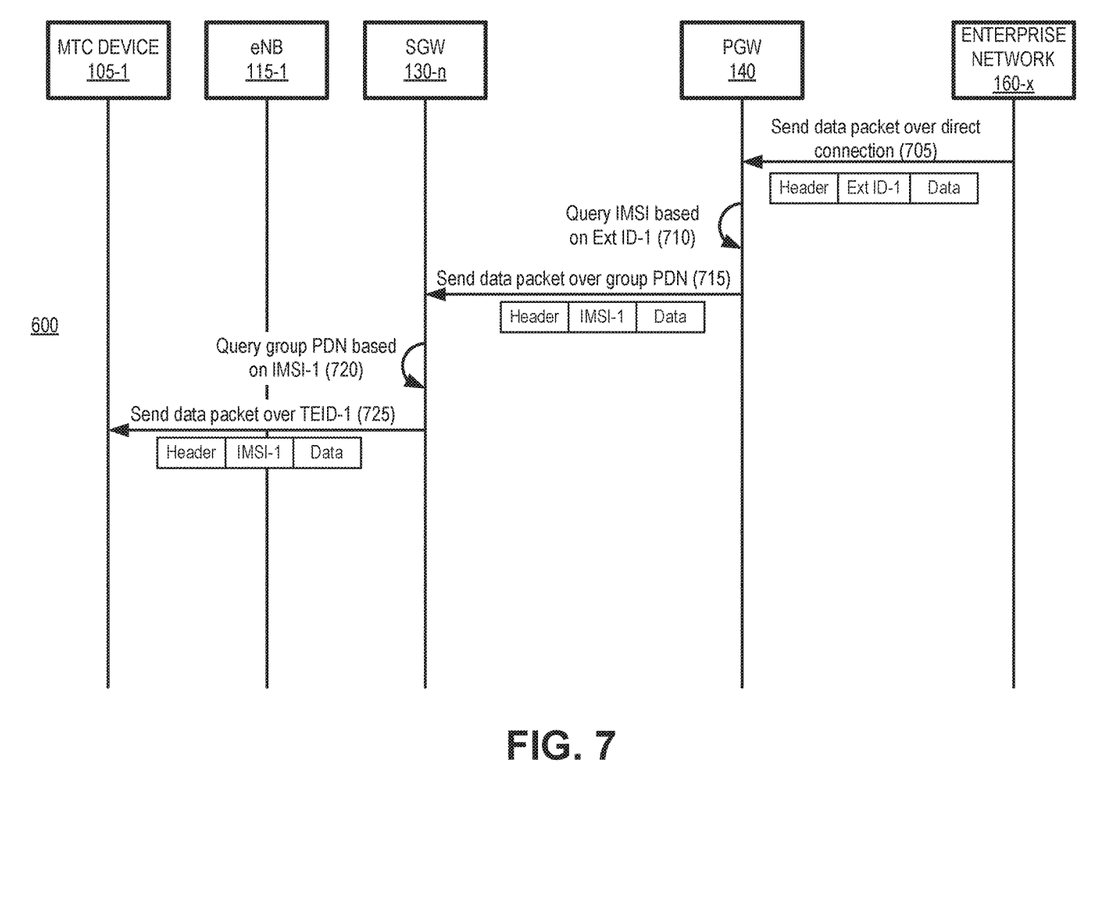
FIG. 7 is a schematic diagrams illustrating communications to send data from an enterprise server to an MTC device using a group PDN in a portion of the network environment of FIG. 1.

FIG. 7 is a diagram showing additional communications in a portion 600 of network environment 100. FIG. 7 represents communications for transmitting a data packet from enterprise network 160-*x* to MTC device 105-1 using a group PDN. As in FIG. 6, assume for FIG. 7, that MTC device 105-1 has been previously registered with ePC network 120 through provision gateway 155 and been assigned to a group associated with enterprise network 160-*x*. Also assume that a bearer path between MTC device 105-1 and enterprise network 160-*x* was previously established as shown above in FIG. 5A.

As shown in reference 705 FIG. 7, enterprise network 160-*x* may send data packets intended for MTC device 105-1 via PGW 140. The data packets may include a header (e.g., an IP header), an external ID value for a device in enterprise network 160-*x* (e.g., Ext-1), and data. PGW 140 may receive the data packets from enterprise network 160-*x* over an SGi interface. As shown by reference 710, PGW 140 may use the external ID value (Ext-1) to query a UE ID for MTC device 105-1. For example, PGW 140 may use PDN-p map 145 (entry 480-1 of FIG. 4) to match Ext-1 (in external ID field 430) with IMSI-1 (in UE ID field 420). PGW 140 may modify the data packets received from PGW 140 to replace the external ID (Ext-1) with the UE ID (IMSI-1).

Based on query 710, PGW 140 may send the modified data packets (including the header, IMSI value, and data) via the assigned group PDN (e.g., vTEID-n) to SGW 130-*n*, as shown by reference 715. As shown by reference 720, SGW 130-*n* may receive the data packets and use the UE ID value (IMSI-1) to query a tunnel ID (TEID-1), associated with MTC device 105-1. For example, PGW 140 may use PDN-s map 135 (entry 390-1 of FIG. 3) to match IMSI-1 (in UE ID field 320) with Teid-1 (in Tunnel ID field 330). As shown by reference number 725, SGW 130-*n* may forward the modified data packets to MTC device 105-1 via eNB 115-1, the modified data packets including the header, the UE ID for MTC device 105-1 (e.g., IMSI-1), and data.

While FIGS. 6 and 7 illustrate exemplary communications to deliver MTC data over a group PDN, according to other embodiments, MTC devices 105 and/or network elements of network portion 600 (e.g., SGW 130-*n*, PGW 140, etc.) may perform additional, different, and/or fewer communications. For example, different fields may be used in PDN-s map 135 and PDN-p map 145 to map delivery of data packets passing through a group PDN. Alternatively, new or modified messages and/or new or modified interfaces associated with the network elements may be implemented to accomplish the similar tasks as described.

Figure 8:
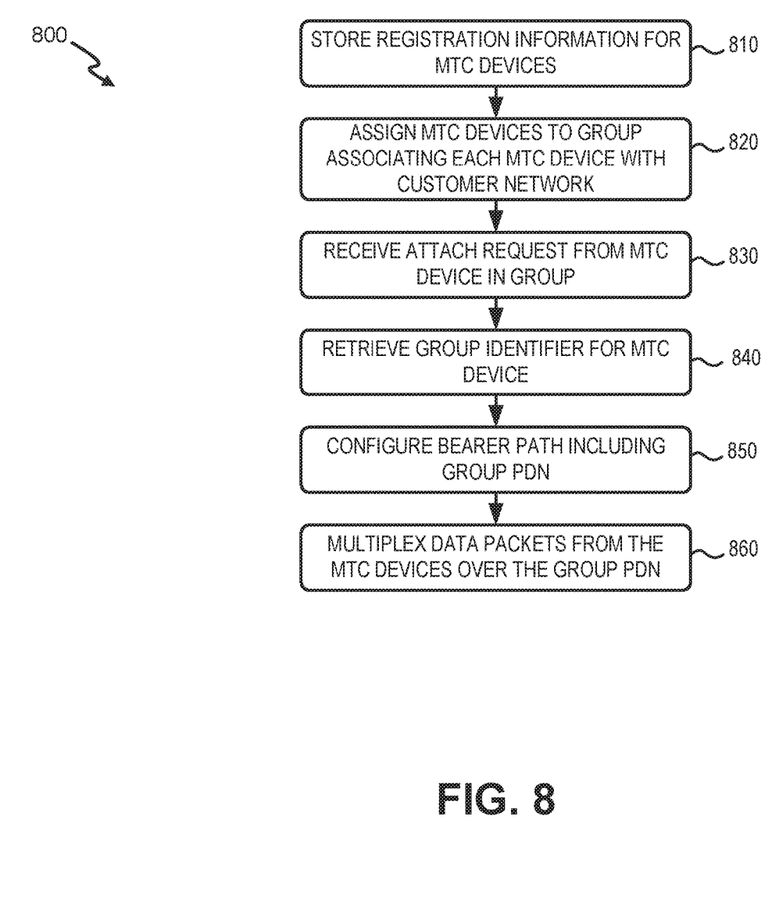
FIGS. 8 and 9 are flow diagrams that illustrate an exemplary process for controlling utilization of network paths for machine-type communications, according to an implementation described herein.
Figure 9:
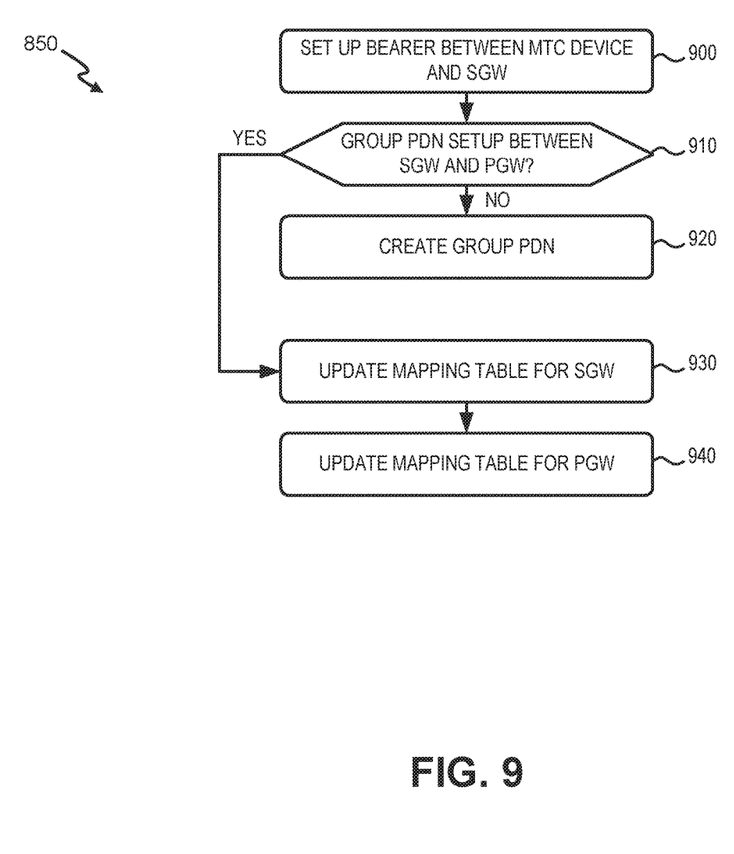

FIGS. 8 and 9 are flow diagrams illustrating an exemplary process 800 for implementing group PDNs for machine-type communications in a cellular network. In one implementation, process 800 may be implemented by SGW 130 and PGW 140. In another implementation, process 800 may be implemented by SGW 130 and PGW 140 in conjunction with one or more other devices in network environment 100, such as MME 125, HSS 150 or another device in ePC 120.

Referring to FIG. 8, process 800 may include storing registration information for MTC devices (block 810), and assigning the MTC devices to a group with a group identifier that associates the MTC devices with a customer network (block 820). For example, as described above in connection with FIG. 5A, customers at enterprise network 160 may register MTC devices 105 using provision gateway 155. Provision gateway 155 may assign each MTC device 105 to one or more PDN groups. PDN group assignments for each MTC device 105 may be stored and sent by provision gateway 155 to HSS 150 for inclusion with subscriber profiles.

Process 800 may also include receiving an attach request from one of the MTC devices in the group (block 830), and retrieving, based on the attach request, the group identifier (block 840). For example, as described above in connection with FIG. 5A, MTC device 105-1 may initiate an attach sequence by providing attach request 510 via eNB 115-1. Attach request 510 may include the IMSI for MTC device 105-1. MME 125 may receive attach request 510 and may obtain from HSS 150 profile data 515 for MTC device 105-1. MME 125 may provide to SGW 130-*n* profile data 515 including the IMSI for MTC device 105-1 and a group ID that associates MTC device 105-1 with enterprise network 160-*x*.

Process 800 may further include configuring a bearer path including the group PDN (block 850). For example, MME 125 may initiate creation of bearer paths between MTC device 105 and ePC 120 and within ePC 120. If a group PDN for enterprise network 160-*x* has not been set up before the attach request from MTC device 105-1, MME 125 may direct SGW 130-*n* to set up a bearer path. Otherwise, MME 125 (or HSS 150) may provide information to update mapping tables for an existing group PDN with information for MTC device 105-1. In some implementations, MME 125 may adjust bandwidth reservations for the group PDN to provide consistent QoS for the number of active MTC devices 105 using the group PDN.

Process 800 may also include multiplexing data packets from the MTC device over the group PDN (block 860). For example, traffic received via the group PDN may be demultiplexed by PGW 140 (e.g., mux/demux module 142) and forwarded with the particular external device ID to enterprise network 160. Alternatively, traffic received from different external devices in enterprise network 160 may be multiplexed by PGW 140 and provided over the group PDN to a SGW 130.

Process block 850 may include the process blocks shown in FIG. 9. As shown in FIG. 9, process block 850 may include setting up a bearer between an MTC device and an SGW (block 900), and determining if a group PDN has already been set up between the SGW and a PGW (block 910). For example, SGW 130-*n* may use profile data 515 to create a bearer 520 between MTC device 105-1, eNB 115-1, and SGW 130-*n* over an S1-U interface. MME 125 may determine if a group PDN for the particular SGW-PGW pair and enterprise (e.g., enterprise network 160-*x*) has been set up before the attach request from MTC device 105-1.

Process block 850 may also include creating the group PDN (block 920) if a group PDN has not already been set up (block 910—NO). For example, if a group PDN between SGW 130-*n* and PGW 140 (for enterprise network 160-*x*) has not been set up before the attach request from MTC device 105-1, MME 125 may direct SGW 130-*n* to set up a bearer path between SGW 130-*n* and PGW 140 using a group PDN (e.g., "vTEID-n").

If a group PDN has already been set up (block 910—YES), process block 850 may also include updating a mapping table for the SGW (block 930) and updating a mapping table for the PGW (block 940). For example, if a group PDN for enterprise network 160-*x* has already been set up between SGW 130-*n* and PGW 140, MME 125 and/or HSS 150 may provide information to update vPDN-s map 135-*n* (for SGW 130-*n*) and vPDN map 145 (for PGW 140) with information for MTC device 105-1.

Systems and methods described herein may provide device groupings and group-based resource management for MTC devices. Use of group PDNs as described herein may allow for concurrent session management and licensing of gateway resources, as well as reducing signaling on serving and PDN gateways. Also, use of group IP addresses may reduce the total number of IP addresses needed to support MTC communications.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 8 and 9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
assigning, by one or more network devices in a network, a machine-type communications (MTC) device to a group with a group identifier, the group associating the MTC device, and other MTC devices, with a customer network, wherein the assigning includes creating a subscription profile, for the MTC device, that includes an MTC identifier, a group PDN identifier, and an external identifier for a device within the customer network;
receiving, by the one or more network devices, an attach request from the MTC device;
retrieving, by the one or more network devices and based on the attach request, the group identifier for the MTC device;
configuring, by the one or more network devices, a bearer path between the MTC device and the customer network, the bearer path including a group packet data network (PDN) that transports data packets from the MTC device, and the other MTC devices, between a serving gateway (SGW) and a PDN gateway (PGW); and
sending, by the one or more network devices, data packets from the MTC device over the group PDN.

2. The method of claim 1, wherein the group PDN uses a common session timer for all traffic and applies a common quality of service (QoS) to data packets from the MTC device and the other MTC devices.

3. The method of claim 2, wherein the data packets from the MTC device and the other MTC devices use the same QoS class identifier (QCI) and automatic repeat request (ARQ) values.

4. The method of claim 1, further comprising:
receiving, by the one or more network devices and via an application program interface (API), registration information for the MTC device to create the subscription profile.

5. The method of claim 4, wherein the subscription profile is stored in a memory of a home subscriber server (HSS).

6. The method of claim 1, wherein the configuring includes updating a bandwidth allocation for the group PDN.

7. The method of claim 1, wherein the configuring further includes:
generating, by the one or more network devices, a mapping table entry for the SGW to associate the MTC device with the group PDN.

8. The method of claim 1, wherein the configuring further includes:
generating, by the one or more network devices, a mapping table entry for the PGW to associate the MTC device with the group PDN.

9. The method of claim 1, further comprising:
maintaining, by the one or more network devices, the group PDN in an active state when the MTC device disconnects from the network and when at least one of the other MTC devices is connected to the customer network.

10. A system comprising one or more network devices in a network, the network devices including:
one or more memories to store instructions; and
one or more processors to execute the instructions to:
assign a machine-type communications (MTC) device to a group with a group identifier, the group associating the MTC device, and other MTC devices, with a customer network;
receive an attach request from the MTC device;
retrieve, based on the attach request, the group identifier for the MTC device;
configure a bearer path between the MTC device and the customer network, the bearer path including a group packet data network (PDN) that transports data packets from the MTC device, and the other MTC devices, between a serving gateway (SGW) and a PDN gateway (PGW); and
send data packets from the MTC device over the group PDN,
wherein the group PDN uses a common session timer for all traffic and applies a common quality of service (QoS) to data packets from the MTC device and the other MTC devices, and
wherein the data packets from the MTC device and the other MTC devices have the same QoS class identifier (QCI) and automatic repeat request (ARQ) values.

11. The system of claim 10, wherein the one or more processors are further to execute the instructions to:
send other data packets from the customer network to the MTC device over the group PDN.

12. The system of claim 10, wherein, sending data packets from the MTC device over the group PDN, the one or more processors are further to execute the instructions to:
aggregate other data packets from the other MTC devices and send the other data packets over the group PDN.

13. The system of claim 12, wherein the data packets and the other data packets are received at the SGW via S1-U interfaces.

14. The system of claim 10, wherein the one or more processors are further to execute the instructions to:
maintain the group PDN in an active state when the MTC device disconnects from the network and when at least one of the other MTC devices is connected to the particular customer network; and
update, when the MTC device disconnects, a bandwidth allocation for the group PDN.

15. The system of claim 10, wherein, configuring a bearer path between the MTC device and the particular customer network, the one or more processors are further to execute the instructions to:
apply a common quality of service (QoS) to data packets from the MTC device and the other MTC devices.

16. The system of claim 10, wherein, configuring a bearer path between the MTC device and the particular customer network, the one or more processors are further to execute the instructions to:
generate a mapping table entry for the SGW to associate the MTC device with the group PDN, and
generate another mapping table entry for the PGW to associate the MTC device with the group PDN.

17. The system of claim 10, wherein, when assigning the MTC device to a group, the one or more processors are further to execute the instructions to:
receive, from a customer device, registration information for the MTC device to create a subscription profile, and
generate the subscription profile, for the MTC device, that includes an MTC identifier, a group PDN identifier, and an external identifier for a device within the customer network.

18. A non-transitory computer-readable medium containing instructions executable by at least one processor, the computer-readable medium comprising one or more instructions to:
assign a machine-type communications (MTC) device to a group with a group identifier, the group associating the MTC device, and other MTC devices, with a particular customer network, wherein the instructions to assign the MTC device to the group include instructions to:
receive, from a customer device, registration information for the MTC device to create a subscription profile, and
generate the subscription profile, for the MTC device, that includes an MTC identifier, a group PDN identifier, and an external identifier for a device within the customer network;
receive an attach request, from the MTC device, for an advance wireless network;
retrieve, based on the attach request, the group identifier for the MTC device;
configure a bearer path between the MTC device and the particular customer network, the bearer path including a group packet data network (PDN) that transports data packets from the MTC device, and the other MTC devices, between a serving gateway (SGW) and a PDN gateway (PGW); and
send data packets from the MTC device over the group PDN.

19. The non-transitory computer-readable medium claim 18, further comprising one or more instructions to:
maintain the group PDN in an active state when the MTC device disconnects from the advance wireless network and when at least one of the other MTC devices is connected to the particular customer network.

20. The method of claim 1, wherein the group PDN uses a common automatic repeat request (ARQ) value for data packets from the MTC device and the other MTC devices.

* * * * *